United States Patent [19]

Lattimer et al.

[11] Patent Number: 4,477,619
[45] Date of Patent: Oct. 16, 1984

[54] PREPARATION OF FABRIC FOR BONDING TO RUBBER

[75] Inventors: Mary B. Lattimer, Hudson; Carl D. Weber, Copley; Zbigniew R. Hardt, Akron, all of Ohio

[73] Assignee: The B. F. Goodrich Company, New York, N.Y.

[21] Appl. No.: 433,490

[22] Filed: Oct. 8, 1982

[51] Int. Cl.$^3$ ............................. C08K 5/06; C08K 5/41
[52] U.S. Cl. ..................................... 524/171; 524/380; 524/389; 524/507; 524/591; 524/875
[58] Field of Search ............... 524/171, 380, 389, 507, 524/591, 875; 156/331.4, 331.7

[56] References Cited

U.S. PATENT DOCUMENTS

| | | | |
|---|---|---|---|
| 3,325,333 | 6/1967 | Kigane et al. | 156/331.4 |
| 3,464,878 | 9/1969 | Schwarz | 156/331.4 |
| 3,642,553 | 2/1972 | Georges | 156/331.4 |
| 3,855,168 | 12/1974 | Ozeki et al. | 524/171 |
| 3,933,677 | 1/1976 | Aufdermarsh | 524/591 |
| 3,997,592 | 12/1976 | Aufdermarsh | 524/591 |

Primary Examiner—Lewis T. Jacobs
Attorney, Agent, or Firm—Alfred D. Lobo; Joseph Januszkiewicz

[57] ABSTRACT

Reinforcing fabrics or cords, particularly those made from adhesive activated (AA) polyester yarn, or non-adhesive activated (non-AA) polyester yarn, or aramid yarn, maybe coated in a first of two dips in a two-step (double-dip) process, or more preferably in a single-step (single-dip) process, with an adhesive dispersion comprising a solid finely divided reversibly blocked polyisocyanate (RBP), having a majority of its primary particles smaller than 1 micron in average diameter, when the RBP is held in suspension as a substantially homogeneous dispersion with the aid of a hydrocarbyl disperser. The RBP is so held with less agitation than is required to produce a vortex in the dispersion. There is no "flaking" on the fabric after it is dried at a temperature higher than 250° F. for less than about 3 minutes, and heat-set at a temperature above that at which the RBP is unblocked. Vulcanized rubber goods reinforced with the coated and cured fabric or cord, characteristically fail in cohesive rubber failure.

15 Claims, 1 Drawing Figure

PREPARATION OF FABRIC FOR BONDING TO RUBBER

BACKGROUND OF THE INVENTION

Over the past two decades or so, a great deal of effort has been devoted to the study of how best to obtain "cohesive rubber failure" in textile-reinforced rubber goods. "Textile" is a general term for fibers which are converted to yarns, cords and fabrics (i.e. woven, knitted and non-woven fabrics). By "cohesive rubber failure" (hereafter, simply "cohesive failure") we refer to failure of a sample of reinforced rubber due to tearing of rubber, rather than tearing of rubber from textile ("adhesive failure"). Thus, cohesive failure is predicated upon the rubber composition itself rather than the bond between textile and rubber. This criterion of failure is particularly sought after in the manufacture of conveyor belts, hose and tires, all of which are normally reinforced with textiles made of rayon, nylon, aramid or polyester fibers. Polyester and aramid fibers are frequently preferred because of their high strength and high modulus which are particularly advantageous in these goods, but it has been found far more difficult to achieve sufficient adhesive bond strengths between polyester and rubber, or aramid and rubber, than between nylon and rubber, so as to result in cohesive failure.

It is a particularly noteworthy fact that, for over more than twenty years, bonding fabric to rubber is still effected with an aqueous dispersion of a resorcinol formaldehyde latex (R/F/L), with a wide spectrum of choices of resin catalyst (usually caustic and ammonia), in situ and pre-formed resins, molar ratios of resorcinol/formaldehyde (R/F), resin/latex (R/L) solids ratio, and adhesion-promoting additives. The difficulty in bonding polyester fibers to rubber is generally attributed to the presence of only hydroxyl (OH) and carboxyl (COOH) groups at the ends of the polyester molecules, while in nylon (for example) there is a relatively high frequency of amide (CONH) groups along the macromolecular chain. Aramid fibers are a special case which are not as satisfactorily coated as nylon, having instead, the adhesive characteristics of polyester fibers. Therefore, this invention is directed to polyester and aramid fibers, and most particularly to adhesive-activated (AA) polyester fibers in cords, woven, knitted and non-woven fabrics used to reinforce conveyor belts, tires and hose.

Many adhesives and bonding systems ("dips") have been used for fabrics made from synthetic linear polyester yarns. Most are cost-ineffective and additionally suffer from various other disadvantages such as toxicity in the case of adhesives based on glycidyl ethers, or water-soluble phenolic condensates; and/or instability as in the case of polyisocyanates, which has resulted in the use of water-insoluble reversibly blocked polyisocyanates (RBP) which, generally being solid, tend to precipitate in the baths in which the fabric is dip-coated. An RBP is so termed because the reactive isocyanate (NCO) group is blocked against significant reaction at low temperature below about 300° F., and then the isocyanate is regenerated when the temperature is raised, usually above 350° F. but below about 500° F. The temperature at which a RBP will dissociate depends mostly on the blocking moiety (or substituting group).

This invention relates specifically to adhesive coatings for fabric-reinforced rubber goods in which the coating comprises an aqueous R/F/L and an RBP, whether the fabric is coated in a single dip ("one-step") bath or a double dip("two-step") bath.

Treatments which utilize phenol-blocked methylene-bis-(4-phenylisocyanate), (MDI for brevity), and the like are disclosed in U.S. Pat. No. 3,307,966, and the use of phenol-aldehyde blocked polyisocyanates are disclosed in U.S. Pat. No. 3,226,276, inter alia. Still other RBPs used are dimerized toluene diisocyanates, and methyl-ethyl-ketoxime blocked polyisocyanates. Additional details on RBPs are disclosed in "Synthesis of Blocked MDI Adducts, their DSC Evaluation and Effect of Pigmentation" by Taki Anagnostou and Ernest Jaul, J. Coatings Tech., pg 35–45, Vol. 53, Bo. 673, February 1981, the disclosure of which is incorporated by reference thereto as if fully set forth herein.

There is also disclosed therein that the unblocking temperature of the RBPs may be lowered by addition of a reactive polyol in equimolar amount with the unblocked MDI. Particularly disclosed is a polyoxyethylene glycol (Carbowax 400) inter alia. Addition of such a large amount of a polyol increases the viscosity of the R/F/L greatly and deleteriously affects the adhesion of rubber to the treated fabric so that cohesive failure cannot be obtained.

In a typical commercial process, polyester fabric is dipped in a first RBP bath in which solid finely ground RBP is dispersed with the aid of a dispersing agent, excess RBP removed, the RBP-coated fabric dried at about 300° F., then the dried fabric is heat-set at a temperature below about 500° F. In the second bath, heat-set RBP-coated fabric is dipped in an R/F/L, excess R/F/L is removed, dried at about 300° F., and heat-set at a temperature below about 500° F. so as to give excellent adhesion of the R/F/L to the RBP-coated fabric.

Though fabric which has been properly coated with either a one-step or a two-step coating (RBP, then R/F/L) has excellent adhesion to rubber if just the right viscosity is maintained so that there is increased dip coverage of the fabric, the risk of "flaking" is high. By "flaking"we refer to flakes or chunks of resin which are formed during the drying and heat-setting of the R/F/L dip on the fabric. This flaking is attributed to blisters caused when moisture entrapped by the R/F/L film volatilizes and expands the film locally (see "Adhesive Design for Improved Adhesive Treatment of Polyester in Conveyor Belts" by Stanhope, H. W., published at International Society of Industrial Yarn Manufacturers, Savannah, Ga., 1977). Flaking severely decreases the adhesion of the rubber to the fabric, thus resulting in adhesive failure (that is, between the rubber/dip interface, and/or the dip/fabric interface), rather than cohesive failure.

It was generally accepted that the best insurance against dip flaking was the use of long fabric drying times of about 3.5 minutes at about 250° F., so that the rate of evaporation from each dip application (whether one-step or two-step dips) could be carefully controlled. These conditions are cost-ineffective due to relatively slow fabric throughput processing times.

All the causes of flaking are far from clear, but solutions to the problem have generally been directed to the chemistry of the baths used, their particular physical properties such as viscosity, and the precise conditions for drying and heat-setting the fabric after it is dipped. It was never suspected, nor did the prior art suggest, that the physical size of primary particles of solid RBP, or how they were held in suspension, might affect the problem of flaking.

Most particularly, since it is much harder to wet and disperse submicron size particles compared to larger particles (e.g. larger than 2 microns), and it is expected that smaller particles would form a film which is more likely than larger particles to trap moisture-causing blisters, there was no indication that sub-micron size particles might alleviate, rather than aggravate, the problem of flaking.

Still further, the physical problems of grinding an RBP to a submicron size are such that highly specialized equipment is required to do so, and sub-micron size RBPs are not commercially available.

Treating fabric with an R/F/L is a peculiar problem. The prior art failed to recognize that flaking was closely tied to adhesive failure. In the art of tire construction, cords in the fabric are arranged coplanarly in only one direction, as for example in fabric used for reinforcing tires, the problem of flaking is not generally critical, though it can be. Therefore, the relevance of the primary particle size of the RBP which usually is as large as about 5 microns, or even larger, was not noteworthy. RBPs with a primary particle size as small as 2 microns may be obtained commercially, and are currently in use.

It is recognized that, in the prior art, to save on the costs of a two-step process, numerous one-step processes have been suggested, but few proved usable. A widely used one-step dip is disclosed in U.S. Pat. No. 3,660,202 in which a water-soluble phenol is combined with a R/F/L. However, when an available RBP is combined with a R/F/L and the fabric coated in such a one-step bath, the coated fabric shows adhesive failure. This is attributed to the effect, on a molecular scale, of the RBP which interferes with the adhesion of the R/F/L. By coating the RBP in a first step, and the R/F/L in a second step, the R/F/L effectively sheaths the RBP-coated fabric, thus negating the effect of the RBP at the rubber-R/F/L interface; which is an accepted reason for the effectiveness of the two-step process. We know of no one-step adhesive composition for coating a polyester fabric which composition combines a solid RBP and a R/F/L, and which fabric in a vulcanizate is characterized by cohesive failure.

To avoid the operating inconveniences of a two-step process, specifically such as solid RBP settling out in the first bath, contamination of the second bath, and the like, and in addition, to save on operating costs, it is more desirable to provide a one-step process for coating polyester and aramid cord with a combination of the RBP and the R/F/L in a single bath without deleteriously affecting the properties of the coated and heat-set cord, and without destroying the useful life of the bath.

Though this invention is applicable to both one-step and two-step coating of fabrics with an aqueous R/F/L dispersion used in combination with a solid finely divided RBP, it is more specifically directed to a one-step process.

SUMMARY OF THE INVENTION

It has been discovered that reinforcing fabrics, particularly those made from adhesive activated (AA) polyester yarn, or non-adhesive activated (non-AA) polyester yarn, or aramid yarn, may be coated in a first of plural dips in a plural-step (usually two-step) process, with a non-viscous adhesive dispersion comprising a solid finely divided reversibly blocked polyisocyanate (RBP), having a majority of its primary particles smaller than 1 micron in average diameter, when the RBP is held in suspension as a substantially homogeneous dispersion with the aid of a hydrocarbyl disperser. The RBP is so held with less agitation than is required to produce a vortex in the dispersion. There is no "flaking" on the fabric after it is dried at a temperature higher than 250° F. for less than about 3 minutes, and heat-set at a temperature above that at which the RBP is unblocked.

It is therefore a general object of this invention to provide a coated AA polyester, or non-AA polyester, or aramid fabric, with an aqueous adhesive dispersion comprising a solid finely divided RBP, the dispersion having a viscosity less than about 25 cps, and in which dispersion the majority of RBP primary particles are less than 1 micron in average diameter. The amount of disperser and RBP particles present is insufficient to increase the viscosity of the dispersion by more than 15%, so that vulcanized rubber goods reinforced with the coated and cured fabric, characteristically fails in cohesive rubber failure.

It has also been discovered that an aforementioned fabric may be coated in a single dip bath (one-step dip) of an aqueous dispersion having a viscosity less than about 25 cps, which dispersion comprises an adhesive latex of a diene polymer (R/F/L) in which an RBP is dispersed, provided that the majority of the RBP primary particles are less than 1 micron in average diameter, and there is added a hydrocarbyl disperser, at least one component of which is a surfactant having less than 20 straight-chain carbon atoms and plural aliphatic hydroxyl (OH) groups. The disperser and RBP particles are present in an amount insufficient to increase the viscosity of the aqueous dispersion by more than 15%. Such a one-step dip is found to remain substantially homogeneous with less agitation than is required to produce a vortex.

It is therefore a general object of this invention to provide a one-step dip for coating an aforementioned fabric with an aqueous adhesive dispersion comprising an R/F/L having a viscosity of less than 25 cps, and an RBP having the aforespecified particle size, and a hydrocarbyl disperser consisting essentially of a surfactant and a dispersing agent. The surfactant preferably has plural aliphatic OH groups and less than about 20 straight-chain carbon atoms, at least one of which OH groups is capable of reacting with the RBP at a temperature above that at which the RBP unblocks. The dispersing agent has essentially no surfactant properties. The amount of surfactant used is from 1 to about 10 parts by weight (wt) per 100 parts of RBP, and the amount of the disperser and RBP present is insufficient to increase the viscosity of the dispersion by more than 15%.

BRIEF DESCRIPTION OF THE DRAWINGS

The foregoing and other objects and advantages of our invention will appear more fully from the following description, made in connection with the accompanying drawing of a preferred embodiment of the invention, and in which.

DETAILED DESCRIPTION OF PREFERRED EMBODIMENTS

Figure 1:
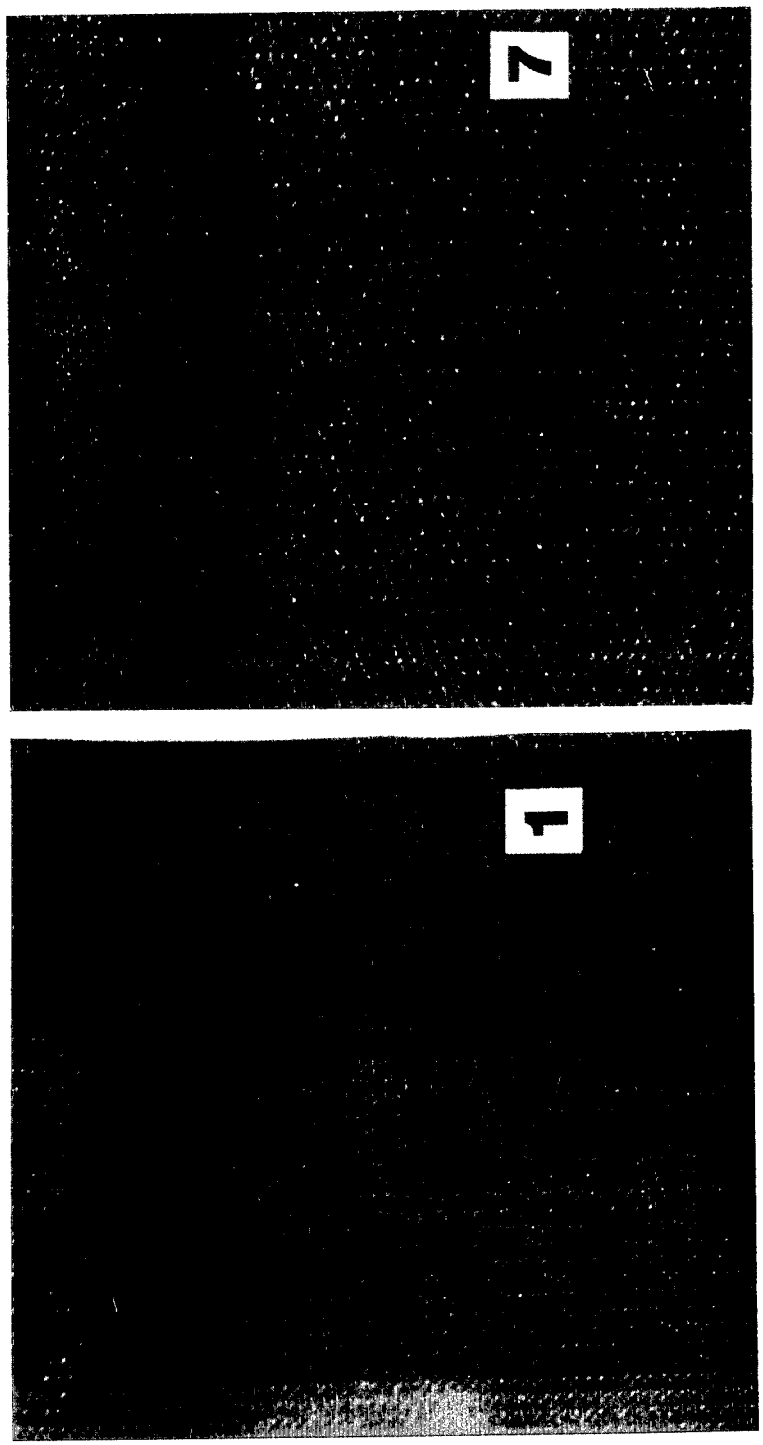
FIG. 1 is a color photograph of two portions (adjacently disposed for comparison) from identical fabric rolls of AA polyester warp/nylon-filled fabric with a plain weave, each portion of fabric having been coated with different R/F/L compositions, one of which is a prior art one-step dip, and the other is the one-step dip of this invention.

According to a preferred aspect of this invention an adhesive-activated (AA), or non-adhesive activated (non-AA) polyester fabric, or an aramid fabric, is pretreated by the process of this invention, to coat the fabric with an aqueous dispersion of a resorcinol formaldehyde (R/F) condensate, a rubber latex (L), (together referred to as an adhesive latex of a diene polymer, R/F/L), and a reversibly blocked polyisocyanate (RBP). The pretreated fabric is then calendered with rubber and vulcanized.

The term "polyester fiber" refers to a manufactured fiber in which the fiber-forming substance is any long-chain synthetic polymer composed of at least 85% by weight of an ester of a substituted aromatic carboxylic acid, including but not restricted to substituted terephthalate units, and parasubstituted hydroxybenzoate units. Examples of ester-forming derivates of terephthalic acid are its aliphatic (including cycloaliphatic) and aryl esters and half-esters, its acid halides and its ammonium and amine salts. Typically, a polyester is a highly homopolymeric or copolymeric linear ester derived from one or more dicarboxylic acids or ester forming derivatives thereof polycondensed with one or more glycols of the series $HO(CH_2)_nOH$ where n is greater than 1 but not exceeding 10 and glycol ethers derived therefrom. The phrase "highly polymeric linear esters" means polyesters which may be drawn to a state of molecular orientation as shown by characteristic X-ray patterns. Examples of the glycols are ethylene, trimethylene, tetramethylene, hexamethylene and decamethylene glycols. The preferred polyester for purposes of this invention is polyethylene terephthalate or a polyester comprising at least 85% by weight of polyethylene terephthalate but the process of this invention may be used with any highly linear polyester whether or not it is adhesive-activated (AA).

By AA polyesters I refer to commercially available polyester cords available from Celanese Corp. as T-811, T-911, T-865, T-879, T-870 and D-230, referred to in a publication by J. Conrad Wease published at a meeting of the International Society of Industrial Fabric Manufacturers in Oct. 28-9, 1980, in Charlotte, N.C., and these AA polyester fabrics are preferred. Non-AA fabrics are made from T-800, T-900, T-864 and D-229 yarn. Comparable AA polyester fabrics are made by Allied Chemical Co. from 1Y73 and 1W73 yarn; non-AA fabrics are made from 1Y70 and 1W70 yarn.

The term "aramid fiber" means a manufactured fibers in which the fiber-forming substance is a long-chain synthetic polyamide in which at least 85% of the amide linkages are attached directly to two aromatic rings, and particularly certain aromatic polyamides such as poly(p-phenylene terephthalamide), also referred to as PPD-T, and the like which are described in U.S. Pat. Nos. 3,869,429 and 3,869,430, and commercially available under the trademark Kevlar from the DuPont Company. The disclosures of the aforementioned U.S. Pat. Nos. 3,869,429 and 3,869,430 are incorporated by reference thereto as if fully set forth herein.

The latex component L of this invention should not be considered as being limited to any specific type of synthetic rubber latex, but rather to include all of those comparable diene polymer latex compositions commonly employed in the rubber fabricating industry. It is preferred however, that the latex contain at least some vinyl pyridine latex. This well-known type of latex is formed from butadiene, styrene, and vinyl pyridine monomers, usually in about a 70/15/15 by weight ratio.

The R/F component of the coating composition is a water-soluble R/F resin, which resin is produced by the well-known reaction of resorcinol and formaldehyde under aqueous acidic conditions. The amount of R/F resin which may be employed with the latex composition can be varied considerably; that is, from about 10 to about 33 parts of the resin solution to 100 parts of the latex on a solids basis, or, about 9 to 25% by weight of the latex dip solution (solids basis). The starting latex is usually diluted with water prior to the addition of the R/F resin to provide the desired final solids content for the coating bath; that is, about 15 to 30% solids by weight. The ratio of resorcinol to formaldehyde in the R/F resin, however, is generally maintained within narrow limits from about equimolar amounts to about 2.0 moles formadehyde/1.0 mole resorcinol.

The RBP may be any reversibly blocked (substituted) polyisocyanate (RBP) in which the substituent contains an active hydrogen atom. Though such active H-containing compounds include alcohols, weak organic acids, weak inorganic acids (e.g. boric acid), phenols, amides, sodium bisulfite, and ketoximes inter alia, the phenols and amides are preferred.

Any of the well-known polyisocyanates may be used in making the RBP, including triphenyl methane-triisocyanate, 2,4-toluene-diisocyanate, hexamethylene-diisocyanate, 4,4'-diphenylmethane diisocyanate and polymers thereof, and the like. As is well known, such RBPs are particularly effective in combination with an R/F/L adhesive containing a rubber latex, when the RBP is heated to regenerate the polyisocyanate and the blocking agent. Blocking agents may be chosen to unblock at relatively low, medium or high temperatures, and any of these blocking agents may be used in the composition of this invention, provided it unblocks at a temperature below that which is deleterious to the fiber being pretreated. As is also well known, the effectiveness of the isocyanate is assumed to derive from the reactivity of the isocyanate group with hydroxyls from the phenol, or the amide group of the lactams. Additional details on RBPs are disclosed in the Anagnostou et al. article, supra.

Among known useful phenol blocking agents used to block the polyisocyanate are monohydroxy benzenes, particularly if they are suitably substituted. Such substituted monohydroxy benzenes include o-chlorophenol, p-chlorophenol, o-bromophenol, p-bromophenol, o-cresol, p-cresol, 3,4-dichlorophenol, p-tertiary butyl phenol, and 2,5-dimethyl phenol. Other preferred blocking agents are dialkyl ketoximes such as methyl-ethyl ketoxime. Still others, and more preferred, are the amides, most preferred of which are lactams such as 2-pyrrolidone, 2-piperidone, caprolactam (6-amino-hexanoic acid lactam), and the like.

A lactam-blocked polyisocyanate is made by reacting a lactam with a polyisocyanate to form a temporary blocking of the polyisocyanate reactivity with water at temperatures at least below 212° F., and also to ensure the production of a resin that is chemically reactive as an adhesive component in a dip.

It is essential that, for best results, and specifically to obtain cohesive failure in reinforced rubber goods made with a high quality rubber compound, that the solid RBP be ground so finely that a majority of the primary particles are smaller than 1 micron in average diameter (referred to herein as being sub-micron). Presently available finely ground RBPs have a majority of their primary particles greater than 1 micron, and typically more than 80 percent are about 2 microns. If such larger particles are used in a dispersion, with conventionally used dispersing agents and surfactants, a high quality rubber vulcanizate reinforced with the coated fabric is likely to fail in adhesive failure.

Measurement of the primary size of the particles is done from a representative sample, a scanning electron micrograph of which is taken with a scanning electron microscope, and the primary particles measured with a Zeiss particle size analyzer (Model TGZ-3).

The hydrocarbyl "disperser" used herein has the dual function of wetting the sub-micron RBP particles and of keeping them in suspension. Despite the small size of the RBP particles, they will settle in a bath unless continuously agitated. Whether the RBP particles are used in a first of plural baths in a multi-step coating process, or in a one-step R/F/L bath, agitation sufficient to vortex the dispersion of the suspension of RBP in the bath shortens the 'life' of the bath due to the effect of air entrapped in during the agitation. Therefore the disperser is used in an amount sufficient to keep the RBP in suspension, substantially homogeneously dispersed, though the level of agitation is insufficient to form a vortex. By "homogeneously dispersed" we mean that the concentration of RBP solids does not vary more than about 10% in the bath. By "hydrocarbyl" we refer to compounds containing only C, H and O in their molecules.

The dispersing agent is primarily responsible for keeping the RBP particles in suspension. It is well-accepted that a dispersing agent is often used to increase the viscosity of the dispersion so as to keep small particles in suspension, and natural gums such as gum tragacinth, guar gum and the like, methyl- and hydroxypropyl methyl-cellulose derivatives, hydroxyethylcellulose, carboxymethylcellulose, and various other modified starches are thickening agents which serve such a function. However, the dispersing agent of this invention is unexpectedly effective even when it is used in an amount insufficient to cause appreciable thickening of the aqueous medium, whether in the one-step bath or in the first step of a two-step process.

It is probable that under certain conditions, for example at a temperature above the unblocking temperature of the RBP, a dispersing agent amy react with the unblocked polyisocyanate, but in no event is there present asmuch as an equimolar amount of dispersing agent and polyisocyanate. In general, the amount of dispersing agent added is less than about 25 parts by wt per 100 parts of RBP, and more preferably is such that the viscosity of the dispersion of RBP particles in either the one-step dip, or the first dip of a two-step process, is not increased by more than about 15%. Typically, the viscosity of a one-step bath is less than about 25 cps, and addition of the disperser does not increase the viscosity by more than about 5 cps.

Preferred dispersing agents are hydroxyl-terminated polyalkylene oxides such as the polyoxyethylenes having a MW in the range from about 200 to about 6000 available under the Carbowax and Polyox brands; polymeric carboxylic acids, particularly the copolymers of carboxylic acids and formaldehyde available under the Tamol brand; and polyhydric alcohols having a MW of from about 8,000 to about 750,000. Most preferred is polyvinyl alcohol (PVA) which functions both as a suspension agent and non-ionic emulsifier. Though the MW of the particular PVA chosen is not critical, the MW should not be so high that the resin is not substantially soluble in water. As will be recognized, such materials as polyhydric alcohols in this preferred MW range are not readily water-soluble, but it is essential that they be solubilized. Preferred PVA is that which has a MW in the range from about 10,000 to about 500,000, measured by standard gel permeation chromatographic (GPC) techniques, but most preferred are those in the range from about 50,000 to about 150,000.

Few surfactants provide effective wetting of RBP particles which are generally smaller than 1 micron, presumably because of the peculiar physical forces associated with such small particles. The problem of wetting becomes even more severe when the environment is a one-step R/F/L dip. For some undefined reason, only surfactants with less than about 20 straight-chain carbon atoms and plural hydroxyl (OH) groups appear to be effective. Preferred surfactants are the alkylaryl polyether sulfonates available under the Triton brand, particularly those in the MW range from about 250 to about 910, for example Triton X-100; and, aliphatic polyols which are olefinically or acetylenically unsaturated.

Most preferred of these surfactants are those which have at least one reactive aliphatic hydroxyl (OH) group, preferably attached to a chain-carbon. Among such surfactants are the acetylenic carbinols most preferred of which are the diols exemplified by alkyl-substituted-5-decyn-4,7-diols of which 2,4,7,9-tetramethyl-5-decyn-4,7-diol is commercially available under the Surfynol®104 brand from Air Products and Chemicals, Inc. The amount of surfactant added is not critical but more than is necessary to give the requisite wetting action serves no useful purpose. It is preferred to add less than about 10 parts by wt surfactant per 100 parts of RBP, and from about 1 to about 5 parts is most preferred. Less than 1 part results in an unacceptably high level of agglomeration between primary particles.

It is hypothesized that the effectiveness of the surfactant is at least in part due to the fact that, during the heat-setting of the R/F/L on the fabric, the surfactant is capable of reacting with the unblocked RBP because of the reactive OH group. This reaction is thought to enhance the adhesion of the fabric to the rubber so as to provide cohesive failure of the vulcanizate. Surfactants which do not so react are thought to result in impurities which adversely affect adhesion. Evidence of the reaction of the reactive OH group of the surfactant with the unblocked RBP is provided in the following experiment.

An RBP, such as diphenylmethane-p,p'-diisocyanate (MDI) blocked with two molecules of ε-caprolactam is dissolved in dichloromethane and examined by field desorption mass spectroscopy (FD) to ascertain its structure. It was found that the RBP is relatively pure adduct having a molecular weight (MW) 476, and shows a trace of impurity at MW 496, which contains a molecule of water.

The RBP is heated in vacuo up to about 180° C., using the direct introduction probe of a mass spectrometer (Finnigan MAT 311A) with electron impact ionization (about 30 eV). The heating was linear at about 50° C./min. Decomposition commenced at about 110° C., and additional components having MW 250,363, and 381 are evolved at about 180° C.

Thereafter, a sample of the reaction mass formed upon heating the RBP with a specific alkynol (2,4,7,9- tetramethyl-5-decyn-4,7-diol) ("decynol") at 150° C. (approx the second stage drying temperature, prior to heat-setting a coated fabric), was analyzed. The sample was dissolved in dichloromethane and its FD spectrum examined. The same components were seen in this spectrum as in the previous spectrum for the heated RBP, except there was an additional peak at MW 589. This MW corresponds to a urethane in which one molecule of lactam has been replaced with a molecule of the decynol. Formation of this urethane continues at higher temperatures in the range from about 350° F. to about 500° F. which is the heat-setting temperature of the coated fabric. The formation of this urethane reaction product in which at least one reactive aliphatic OH group of the decynol disperser is reacted with the RBP, is confirmed by NMR analysis. It is difficultly soluble in common solvents such as, dichloromethane, methanol, acetone, tetrahydrofuran, and dimethylformamide.

The hydrocarbyl disperser and RBP admixed in the R/F/L composition is usually applied by dipping and squeezing to remove excess dip solution and evenly distributing the R/F/L on the treated polyester fabric surface. Padding or spraying or other techniques known in the art for applying a bath solution to fabrics may also be employed. For conveyor belt fabrics, the pick-up of admixture of RBP and R/F/L is preferably from about 0.5 to about 20% (dry wt pick-up), generally less than about 10%, and more preferably from about 2 to about 8% by wt (dry wt pick-up).

The preferred type of resinous R/F composition is that type made by reacting an aldehyde with resorcinol, or other polyhydric phenol which yields a resin which is substantially soluble in water. Suitable aldehydes that may be used, in addition to the preferred aldehyde formaldehyde, are acrolein, glyoxal, furfural, crotonaldehyde, aldol, hexamethoxymethylmelamine, and benzylaldehyde. Suitable polyhydric phenols which may be reacted with about an equimolar amount of one of the aforementioned aldehydes include, in addition to resorcinol, other difunctional compounds such as cresol, catechol, phloroglucinol, saligenin, dibeta-naphthol, xylenol, 4,6-dimethyl-resorcinol, 2,5-dimethyl-resorcinol, hydroquinone, furfural alcohol, orcinol, pyrogallol, beta-naphthol, aminophenol, guaiacol, as well as urea and melamine.

Preferably the coated fabrics are then dried at about 300° F., and the coating cured (heat-set) at about 300° F. to 500° F., preferably about 350° F. to 450° F. for from 30 sec to 10 min, depending on the curing temperature, and preferably less than about 3 min. A curing temperature close to a softening temperature of the polyester material is preferred. An excessively high curing temperature can readily be detected by the fusing of fibres to produce stiff, relatively inflexible products. If desired, a second coating may be applied, although the solids content of the second coating bath is generally adjusted because the coated fabric does not as a rule, pick up as much of the R/F/L as the uncoated fabric.

The dip compositions of this invention provide cohesive failure when applied to the aforespecified types of fabrics whether they are used in braided hose or spiral-wrapped hose or when applied to woven fabrics such as are used in conveyor belts, power drive belts (V-belts), pneumatic de-icer means on aircraft wings, and many other reinforced rubber products. The dip composition is typically applied to a fabric in a one-step process by feeding the fabric under tension through a dip bath, removing excess dip, passing the dip-coated fabric through a drying zone at a temperature in the range from about 200° F. to about 350° F. to dry it under tension, and thereafter heating it further in what is normally referred to as a heat-setting temperature range from about 350° F. but below about 500° F. to complete the adhesion of the dip to the fabric. Such treatment of fabric may be done discontinuously, but continuous treatment of the fabric under tension is preferred. After the heat-setting of the fabric, it may be stored prior to being used. Typically, the amount of surfactant present in the cured fabric is less than about 1% by wt of the fabric, and the heat-set coating is less than about 10% by wt of the fabric.

The compositions of this invention, that is, whether the adhesive composition includes an R/F/L as in the one-step bath, or not, are characterized by the presence of sub-micron particles of RBP homogeneously held in suspension and which when coated on a fabric, may be dried at a temperature above 250° F., preferably about 350° F., but below that deleterious to the fabric, in less than 3 mins without causing flaking.

The synthetic latex used in the following examples is the same as the commercial material made from about 70% butadiene, 20% styrene, and 10% vinyl pyridine conventionally used for coating belt fabric and tire cord. The R/F is a commercial partial reaction product of the two constituents supplied as a concentrated (75%) solution in water.

EXAMPLE 1

A one-step dip is prepared containing the following ingredients, given as parts by weight, for coating a woven conveyor belt fabric:

|  | Total | Solids |
|---|---|---|
| Part A | | |
| Synthetic latex 38% | 195 | 74 |
| Water | 175 | |
| Part B | | |
| Resorcinol-formaldehyde | 15 | 11.25 |
| Ammonia 28% | 30 | |
| Caustic soda (1.5% solids) | 15 | 0.23 |
| Part C | | |
| Formalin (37% solids) | 8 | 3 |
| Water | 15 | |
| Part D | | |
| RBP (40% solid dispersion)* | | 5.7 |
| Surfynol$^R$ 104 surfactant | | 0.19 |
| Gelvatol$^R$ dispersing agent | | 0.19 |
| Water | 150 | |

*caprolactam-blocked MDI

A mixture of parts A and B is first formed, and part C added to the mixture with thorough agitation. The mixture is allowed to stand (age) for from about 16 to about 24 hours and the RBP (part D) mixed into the aged mixture, and agitation is maintained to keep the solids homogenously dispersed, the level of agitation being insufficient to form a vortex.

Fabric with a plain weave made from two (2) ply T-811 AA polyethylene terephthalate yarns of 1000 denier per ply (referred to as "1000/2" yarn), is dipped in the one-step dip so formed, dried under tension at about 300° F., and heat-set at about 450° F. The fabric is then embedded in rubber and vulcanized for 180° peel adhesion tests. H-pull tests were run on vulcanized samples made with cord from the same yarn.

The results obtained with a one-step prior art bath, and that of this invention are compared as follows:

A. RBP particles in the range from 1 to about 3 microns (the majority are about 2 microns) are mixed with conventionally used surfactants and dispersing agents in an R/F/L dip formulated with a 1.2:1 mol ratio of formaldehyde to resorcinol as specified in the publication "TBI 26 Fortrel® Type 800 Polyester Industrial Yarn", published by Celanese Fibers Marketing Company, the disclosure of which is incorporated by reference thereto as if full set forth herein. The dip is coated on a fabric roll (#7) under tension at 300° F. (drum roll temperature) and heat-set at 450° F. A portion of the fabric (marked 7) is shown in the color photograph of FIG. 1. It is seen that flakes, indicated by reference character F, are easily visible. The fabric is embedded in a conventional high-grade rubber stock (details of which are provided hereinafter) as is usually done for the manufacture of a conveyor belt, and a portion of the belt is tested. The portion fails in adhesive failure.

B. In a manner analogous to that described immediately hereinabove, the same R/F/L composition for a one-step dip is used except the RBP particles are submicron (the majority are less than 1 micron), and the one-step dip includes about 3 parts of decynol surfactant, and about 3 parts of PVA dispersing agent, per 100 parts of RBP particles. The fabric was identically coated as before, dried and heat-set under identical conditions. A portion of the fabric (marked 1) is shown in the photograph. It is evident there are no flakes. The fabric was embedded in a conveyor belt in the same manner as in 1 A hereinabove, and a portion of the belt tested. It failed in cohesive failure.

The rubber stock is a conventional high-grade rubber stock such as is used on conveyor belts manufactured for conveying coal, iron ore, and the like, typically having the following composition.*

| Ingredients | Parts (by wt) |
| --- | --- |
| Rubber (blend of SBR/NR) | 100. |
| Reogen (plasticizer) | 2. |
| Stearic acid | 1. |
| Zinc oxide | 5. |
| Agerite Resin D (antioxidant) | 1. |
| Paraflux (plasticizer) | 7. |
| Sundex 790 (plasticizer) | 7. |
| Carbon (SRF black N-770 | 25. |
| Carbon (FEF black N-550) | 20. |
| Amax (accelerator) | 1.25 |
| Sulfur | 2.25 |
| Methyl Tuads (accelerator) | 0.2 |

*The Vanderbilt Handbook, (edited by Babbit, R.)., R. T. Vanderbilt Co., 1978.

The H-pull test (ASTM D-2138) results on cord, and peel adhesion test (ASTM D-413-76) results for a sample of conveyor belt made from fabric #1 and from a sample (second sample) of a conveyor belt made from fabric #7, are set forth herebelow:

Adhesion between a cord of AA polyester and the foregoing rubber stock was tested in a vulcanized sample as prescribed in ASTM D-2138 H-pull test, the details of which are incorporated by reference thereto as if fully set forth herein.

The one-step dip of example 1A is used to coat cord which is dried and heat-set under the conditions set forth therein, embedded in the rubber and vulcanized (first sample, prior art one-step dip) herebelow. The one-step dip of example 1B was used to coat cord from the same batch as the previous cord, under the same conditions, and the coated cord was embedded in the same rubber stock and vulcanized under the identical conditions as the previous (first) sample. The results for the first and second sample (one-step dip, this invention) are set forth herebelow:

| | Average of 5 H-pull tests | |
| --- | --- | --- |
| | non-AA cord | AA cord |
| First sample (prior art one-step dip) | 13 lb. | 21 lb. |
| Second sample (one-step dip, this invention) | 21 lb. | 23 lb. |

It is clear that the H-pull test results for the second sample are higher than those for the first. Moreover, visual examination of the cord pulled out shows that it is black, and coated with rubber, indicating cohesive failure.

Peel adhesion between two portions of AA fabric from identical rolls of AA polyester were compared by embedding fabric cured as described in example 1B (roll marked #1, this invention, one-step) in the aforespecified rubber stock, and vulcanizing. Similarly a portion of the fabric is treated as described in example 1A (roll marked #7, prior art one-step), and embedded in the same rubber stock and vulcanized under identical conditions. Strips of the vulcanizates, prepared as described in ASTM D-413-76, the details of which are incorporated by reference thereto as if fully set forth herein, are then tested. The results are set forth herebelow:

| | Average of 5 peel tests |
| --- | --- |
| Sample from roll #7 (prior art one-step dip) | 50 lb/in. |
| Sample from roll #1 (this invention, one-step) | 65 lb/in. |

It is evident that the peel tests for the sample with the fabric treated with the dip composition of this invention provide superior adhesion. A visual examination of the fabric from roll #1, after the peel test, shows cohesive failure. The sample from roll #7 shows adhesive failure.

Results obtained with cords and fabrics made from aramid yarns commercially available under the designation Kevlar ®1500/2 showed that the H-pull-out forces for cord, and peel adhesion for the fabrics coated with the one-step dip of this invention were substantially higher than those for cords and fabrics coated with prior art compositions containing RBP particles larger than 1 micron and including conventionally used dispersing agents and surfactants. All samples fail in cohesive failure with our one-step dip.

EXAMPLE 2

A two-step process is used to coat portions a woven fabric of non-AA polyester, with a prior art first dip, and a first dip of this invention, and the results compared. The first dip is referred to herein as an aqueous adhesive dispersion, but does not include a latex of a diene polymer.

A. A first dip is prepared according to the formulation set forth in the publication "Dipping Systems" Vol No. 1, Table I, pg 2 (March 1977), published by Koppers Resins, the disclosure of which is incorporated by reference thereto as if fully set forth herein. However, caprolactam-blocked RBP in the size range from 1 to 3 microns was substituted for the Hylene ®MP phenol-blocked MDI particles. The first dip composition is as follows: RBP, Expon®812 resin, Gum Tragacinth (2%) and deionized water, in amounts of 3.6, 1.36 and 0.04 parts (dry basis).

The fabric is coated in the first dip under tension and is dried at 300° F. for less than 3 mins and heat-set at 450° F. for less than 3 mins.

The dried fabric is then coated in a second dip formulated as set forth in Table II, pg 3, of the Koppers brochure, supra. The resin solution of this dip was formulated as follows:

Penacolite Resin R-2200 (70%), sodium hydroxide (50%), formaldehyde (37%), and deionized water, in amounts of 18.0, 0.6, 12.2 and 175 parts (wet basis) respectively. The R/F/L mix contained vinyl pyridine latex (41%), ammonium hydroxide (28%), and deionized water in 244.0, 12.0 and 69.4 parts (wet basis) respectively.

The fabric coated in the second dip was dried at 300° F., then heat-set at 450° F. under tension, as described hereinabove. Again, the presence of flakes was noted.

The cured fabric was embedded in high-grade rubber as before in the manufacture of a conveyor belt, a vulcanized portion of which was tested and found to fail in adhesive failure.

B. In a manner analogous to that described hereinabove, in a second case, the same first dip was used as in example 2 A hereinabove, except that the majority of the RBP particles were smaller than 1 micron, and instead of Gum Tragacinth there was substituted equal parts by weight of decynol and Gelvatol. The fabric was coated in this first dip and dried at 300° F.

The dried fabric was then coated in a second dip having the same formulation as that of the second dip in 2 A hereinabove. The fabric coated in the second dip was dried at 300° F. and cured at 450° F. No flakes were observed on the surface of the fabric. The cured fabric was embedded in rubber and a conveyor belt formed as before, and a portion of the vulcanized belt tested. It failed in cohesive failure.

Results obtained with cords and fabrics made from aramid yarns commercially available under the designation Kevlar ®1500/2 showed that the H-pull-out forces for cords, and peel adhesion for the fabrics coated with the two-step dip in a manner analogous to that described immediately hereinabove in this example 2B, were substantially higher than those for aramid cords and fabrics coated with prior art first dip compositions containing RBP particles larger than 1 micron and conventionally used dispersing agents and surfactants. All samples failed in cohesive failure.

We claim:

1. An adhesive composition for coating a fabric or cord made from polyester or aramid fibers, in a first of plural baths, comprising,
   an aqueous adhesive dispersion, having a viscosity of less than 25 cps, of
   (a) a solid reversibly blocked polyisocyanate (RBP) formed by reversibly blocking a polyisocyanate with a blocking agent capable of an addition reaction with it, said RBP having a majority of primary particles less than 1 micron in average diameter, and,
   (b) a hydrocarbyl disperser consisting essentially of a surfactant and a dispersing agent having essentially no surface active properties, said surfactant having plural aliphatic hydroxyl (OH) groups and less than 20 straight-chain carbon atoms, said disperser and RBP particles being present in an amount insufficient to increase the viscosity of said dispersion by more than 15%,
   whereby said RBP is held in suspension in a substantially homogeneous dispersion with less agitation than is required to produce a vortex in said dispersion.

2. The composition of claim 1 wherein at least one of said plural aliphatic hydroxyl groups is a reactive hydroxyl group capable of reacting with said RBP at a temperature above that at which said RBP is unblocked.

3. The composition of claim 1 wherein said RBP is blocked with blocking agent selected from the group consisting of an alkyl-ketoxime and caprolactam.

4. The composition of claim 2 wherein said reactive hydroxyl group is attached to a chain-carbon atom.

5. The composition of claim 2 wherein said surfactant is selected from the group consisting of an alkylaryl polyether sulfonate, and an acetylenic carbinol.

6. The composition of claim 2 wherein said dispersing agent is selected from the group consisting of a polyalkylene oxide glycol, copolymers of carboxylic acids and formaldehyde, and a polyhydric alcohol.

7. The composition of claim 6 wherein said polyhydric alcohol is polyvinyl alcohol having a molecular weight in the range from about 10,000 to about 500,000.

8. The composition of claim 5 wherein said acetylenic carbinol is 2,4,7,9-tetramethyl-5-decyn-4,7-diol.

9. An adhesive composition for coating a fabric or cord made from polyester or aramid fibers, in a single bath (one-step dip), comprising,
   an aqueous adhesive dispersion, having a viscosity of less than 25 cps, of
   (a) an adhesive latex of a diene polymer and a resorcinol/formaldehyde resin present in an amount in the range from about 9% to about 25% by weight of said adhesive latex on a solids basis,
   (b) a solid reversibly blocked polyisocyanate (RBP) formed by reversibly blocking a polyisocyanate with a blocking agent capable of an addition reaction with it, said RBP having a majority of primary particles less than 1 micron in average diameter, and,
   (c) a hydrocarbyl disperser consisting essentially of a surfactant and a dispersing agent having essentially no surface active properties, said surfactant having plural aliphatic hydroxyl (OH) groups and less than 20 straight-chain carbon atoms, said disperser and RBP particles being present in an amount insufficient to increase the viscosity of said dispersion by more than 15%,
   whereby said RBP is held in suspension in a substantially homogeneous dispersion with less agitation than is required to produce a vortex in said dispersion.

10. The composition of claim 9 at least one of said plural aliphatic hydroxyl groups is a reactive hydroxyl group capable of reacting with said RBP at a temperature above that at which said RBP is unblocked.

11. The composition of claim 9 wherein said RBP is blocked with a blocking agent selected from the groups consisting of alkyl-ketoxime and caprolactam.

12. The composition of claim 10 wherein said reactive hydroxyl group is attached to a chain-carbon atom.

13. The composition of claim 10 wherein said surfactant is selected from the group consisting of an alkylaryl polyether sulfonate, and an acetylenic carbinol.

14. The composition of claim 10 wherein said dispersing agent is selected from the group consisting of a polyalkylene oxide glycol, copolymers of carboxylic acids and formaldehyde, and a polyhydric alcohol.

15. The composition of claim 10 wherein said polyhydric alcohol is polyvinyl alcohol having a molecular weight in the range from about 10,000 to about 500,000.

* * * * *